(12) United States Patent
Schoenfeld et al.

(10) Patent No.: US 7,746,478 B2
(45) Date of Patent: Jun. 29, 2010

(54) METHOD FOR INTERFEROMETRICALLY MEASURING AN OPTICAL PROPERTY OF A TEST PIECE AND A DEVICE SUITED FOR CARRYING OUT THIS METHOD

(75) Inventors: Doerte Schoenfeld, Hanau (DE); Thomas Reuter, Mainhausen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 303 days.

(21) Appl. No.: 11/990,886

(22) PCT Filed: Jul. 20, 2006

(86) PCT No.: PCT/EP2006/064452
§ 371 (c)(1),
(2), (4) Date: Feb. 22, 2008

(87) PCT Pub. No.: WO2007/023042
PCT Pub. Date: Mar. 1, 2007

(65) Prior Publication Data
US 2009/0103105 A1    Apr. 23, 2009

(30) Foreign Application Priority Data
Aug. 26, 2005    (DE) .................... 10 2005 040 749

(51) Int. Cl.
*G01B 11/02*    (2006.01)
(52) U.S. Cl. ..................................... 356/512
(58) Field of Classification Search ................ 356/496, 356/497, 503, 504, 511–514
See application file for complete search history.

(56) References Cited

U.S. PATENT DOCUMENTS 5,838,442 A    11/1998    Bray (Continued)

FOREIGN PATENT DOCUMENTS

DE    215 168    10/1984

(Continued)

OTHER PUBLICATIONS

Schonfeld et al., "Stitching Oil-on Interferometer of Large Fused Silica Blanks," Sep. 2005, Proceedings of SPIE, vol. 5965, pp. 59650V.1—V.8.*

(Continued)

*Primary Examiner*—Gregory J Toatley, Jr.
*Assistant Examiner*—Scott M Richey
(74) *Attorney, Agent, or Firm*—Tiajoloff and Kelly LLP

(57) ABSTRACT

The invention relates to a method for interferometrically measuring large optics. A combination of a method known as stitching technique, during which the sub-interferograms are determined on partial surfaces of measuring area and are joined in a software-controlled manner and which, as a result, enables the use of small, more cost-effective interferometers, however polished surfaces of the test piece being assumed, together with an immersion method, during which, in fact, lower demands for the surface quality of the test piece exist that, however, is accompanied by edge faults. In order to make this combination possible, a modification of the stitching technique is developed, during which the measuring area (CA) is completely covered by a film consisting of an immersion liquid. A device a suited for carrying out this method is characterized by contact bodies, which are made of transparent material, rest upon the main surfaces of the test piece, and which completely cover the measuring area (CA), a film consisting of an immersion liquid being formed between the contact bodies and the main surfaces of the test piece.

20 Claims, 3 Drawing Sheets

U.S. PATENT DOCUMENTS

Figure 1A:
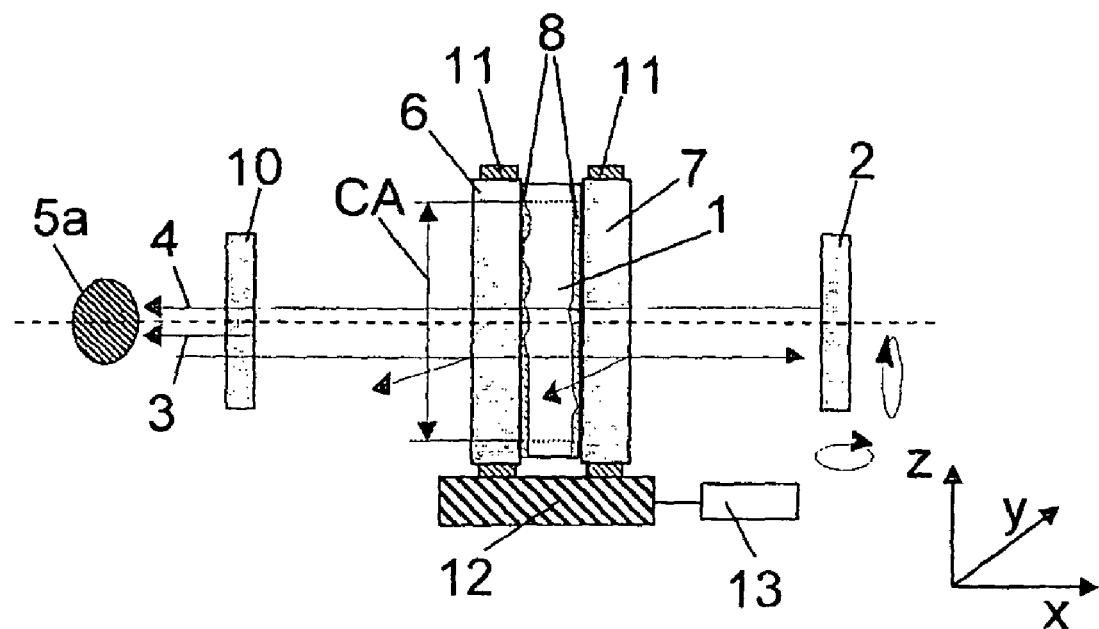

| | | | |
|---|---|---|---|
| 6,956,657 B2 * | 10/2005 | Golini et al. | 356/512 |
| 7,221,461 B2 * | 5/2007 | Evans | 356/511 |
| 7,324,210 B2 * | 1/2008 | De Groot et al. | 356/497 |
| 7,408,652 B2 * | 8/2008 | Wegmann et al. | 356/515 |
| 7,528,959 B2 * | 5/2009 | Novotny et al. | 356/496 |
| 7,553,022 B2 * | 6/2009 | Neal et al. | 351/246 |
| 7,554,669 B2 * | 6/2009 | Buckland et al. | 356/479 |
| 7,616,330 B2 * | 11/2009 | Neal et al. | 356/625 |
| 2003/0110809 A1 | 6/2003 | Linder et al. | |
| 2003/0117632 A1 | 6/2003 | Golini et al. | |
| 2005/0243328 A1 | 11/2005 | Wegmann et al. | |
| 2007/0019210 A1 * | 1/2007 | Kuhn et al. | 356/512 |
| 2008/0252876 A1 * | 10/2008 | Mengel et al. | 356/51 |

FOREIGN PATENT DOCUMENTS

| | | |
|---|---|---|
| DE | 4401145 C1 | 5/1995 |
| DE | 69706247 T2 | 8/2001 |
| DE | 102 61 775 | 7/2004 |
| EP | 1324006 A1 | 7/2003 |

OTHER PUBLICATIONS espacenet English language abstract for DE4401145, May 11, 1995.

Michael Bray, "Stitching interferometer for large optics: recent developments of a system," Proceedings of SPIE, Third International Conference on Solid State Lasers for Application to Inertial Confinement Fusion, vol. 3492, Jul. 30, 1999, pp. 946-856.

Assoufid et al., "3-D Profile Measurements of Large X-Ray Synchrontron Radiation Mirrors using Stitching Interferometry," Proceedings of SPIE; X-Ray Mirrors, Crystals, and Multilayers II, vol. 4782, No. 30, Dec. 30, 2002, pp. 21-28.

* cited by examiner

METHOD FOR INTERFEROMETRICALLY MEASURING AN OPTICAL PROPERTY OF A TEST PIECE AND A DEVICE SUITED FOR CARRYING OUT THIS METHOD

The present invention refers to a method for the interferometric measurement of an optical characteristic of a measurement area of a specimen of transparent material to be measured, including two opposite main surfaces, comprising the following method steps:
(a) arranging the specimen in a measurement light beam of an interferometer such that a measurement beam of the interferometer passes through the main surfaces of the specimen in a first surface portion of the measurement area, and performing a first interferometric measurement to obtain a first group of measurement data;
(b) arranging the specimen in the measurement light beam such that the measurement beam passes through the main surfaces of the specimen in a second surface portion of the measurement area which is arranged offset relative to the first surface portion and overlaps therewith in an overlap region, and performing at least one second interferometric measurement to obtain a second group of measurement data;
(c) matching the measurement data of first and second group using redundant information obtained in the overlap region for preparing a total interferogram on the measurement area.

Moreover, the present invention refers to an apparatus for measuring an optical characteristic in the measurement area of a specimen of transparent material having two opposite main surfaces,
(a) comprising a holding device for the specimen;
(b) an interferometer suited to direct a measurement beam onto surface portions of a measurement area of the specimen to be specified and to measure sub-interferograms of the surface portions;
(c) a transfer system by means of which the specimen is movable in a direction perpendicular to the measurement beam so that measurements can be carried out on a plurality of surface portions which fully encompass the measurement area, each of the surface portions being overlapped by a neighboring surface portion at least in part in an overlap region; and
(d) a control unit which controls the interferometer and the transfer system and, on the basis of the sub-interferograms, determines the shape of the wavefront transmitted by the specimen, the measurement data determined on the overlap regions being used for matching the sub-interferograms with one another.

The homogeneity of the refractive index of optical elements, such as optical lenses, is often measured by interferometry. In this process interference patterns that are created between a measurement beam passing through the specimen and a reference beam are measured with an interferometer and evaluated. Typical dimensions of large lenses are 450 mm×450 mm; in special designs, they are also clearly larger. The requirements made on the homogeneity of such large-area optical elements and thus also on the measurement technique have been increasing for years, especially with respect to measurement accuracy and size of the measurement area.

As a rule, in an interferometric measurement the diameter of the measurement beam of the interferometer is at least as large as the measurement area assigned to the specified volume area of the specimen (this volume area is also called CA (clear aperture) area). Interferometers with a measurement beam diameter of 12 inches are often used for such measurements. Larger measurement beams require a complicated optical enlargement, which is very expensive.

As an alternative, large measurement areas are also measured using standard interferometers in a technique called "stitching". "Stitching" designates a function for connecting areas through common points, areas or edges. In the stitching technique, sub-interferograms, i.e. a plurality of surface portions of the measurement area, are determined that as a whole cover the measurement area completely. The sub-interferograms of neighboring surface portions are here overlapping in an overlap region. The measurement results in the overlap region are used for adapting the measurement results of the various surface portions in a software-controlled manner to one another such that the individual sub-interferograms can be composed as perfectly as possible to form a total interferogram indicative of the whole measurement area of the specimen.

This technique which has e.g. been described by "Otsubo, Okada, Tsujiuchi, Measurement of large plane surface shapes by connecting small-aperture interferograms, Opt. Eng. 33 (2), pp. 608-613, 1994 and "M. Bray, Stitching interferometry: how and why it works, Proc. SPIE 3739, pp. 259-273, 1999", requires an exact surface polish of the specimen when applied to the measurement of the refractive index homogeneity and is thus very time-consuming and expensive.

An apparatus for performing the stitching technique requires a transfer unit with control for the precise positioning of a specimen and measurement beam relative to each other and a computer for the software-aided positioning and adaptation of the sub-interferograms. Such an apparatus is e.g. known from DE 697 06 247 T2.

Furthermore, DE 44 01 145 C1 describes an interferometric measuring method for determining the radial refractive index profile of optical preforms. On a thin section of the end faces of the preform, a cut edge is produced in radial direction, the thin section is introduced into an immersion liquid, and double images of the cut edge are generated by means of a shearing interference microscope. The radial refractive index profile can be determined on the basis of the image overlap.

DD 215 168 B deals with the determination of the longitudinal homogeneity of optical preforms by means of an interferometric test method in that a laser beam is split into two coherent beams, of which one passes through the preform to be checked and the other through a reference sample. Both laser beams are superposed and imaged on a screen such that interference in the refractive index profile appears as deformation of equidistant lines.

DE 102 61 775 A1 discloses an apparatus for the optical measurement of an imaging system of very large aperture by means of wavefront detection using shearing interferometry. To this end the spaces between adjacent optics components of the imaging system are each filled with an immersion fluid. As a result the test beam cross-section can be reduced without loss of information, so that even in imaging systems of very large aperture in the order of more than 1.0, aberrations can be accurately measured by means of shearing interferometry.

It is the object of the present invention to improve the known "stitching technique" with respect to efficiency and saving of costs while maintaining a high measurement accuracy and reproducibility.

It is also the object of the present invention to provide an inexpensive and operationally reliable apparatus which can be handled relatively easily for performing the method.

As for the method, this object starting from the above-mentioned method is achieved according to the invention in that the measurement area is fully covered with a film consisting of an immersion fluid, which is formed between the main surfaces of the specimen and contact bodies of transparent material.

Hence, the measurement method according to the invention provides for the use of an immersion fluid between the main surfaces of the specimen and the contact bodies. This measure is known as such and for instance described in P. Hartmann, R. Mackh, H. Kohlmann, "Advances in the homogeneity measurement of optical glasses at the Schoff 20 inch Fizeau interferometer", Proc. SPIE 2775, pp. 108-114, 1996.

An immersion fluid is here fixed on the main surfaces of the specimen by means of contact plates that are distinguished by high homogeneity and precise surface polish. The additional distortions of the measurement beam caused in this "sandwich arrangement" (contact plate-immersion fluid-specimen-immersion fluid-contact plate) by the contact plates are compensated by a reference measurement without specimen in the light path and taken into account.

The use of the immersion fluid permits the employment of a not precisely polished specimen, so that the efforts taken in surface polishing are here dispensed with. It is enough when the mechanical finishing work on the main surfaces is carried out for example by grinding, milling, lapping, or cutting.

In this "immersion method", however, aberrations are inherent in the edge portion of the film of the immersion fluid. As a rule, the contact plates are matched to the size of the measurement beam of the interferometer, and specimens are typically smaller so that such errors normally occur on the edge of the measurement field outside the CA area and are not objectionable. When specimens are measured having dimensions larger than those of the measurement beam of the interferometer, such edge errors appear on the edge of the sub-interferograms, i.e. in the overlap region, and prevent or render difficult the above-described "stitching technique", i.e. the software-controlled joining of several sub-interferograms to obtain a total interferogram based on the measurement results in the overlap regions. The modification of the known method according to the present invention consists now in that the film made up of immersion fluid is distributed by means of sufficiently large contact bodies over an area encompassing the whole measurement area of the specimen. Hence, the whole portion of the main surfaces to be assigned to the CA area is completely wetted with a film consisting of an immersion fluid and is covered by contact bodies. The edge errors inherent to the immersion method are thereby avoided or shifted into the outside area of the specimen that does not pertain to the CA area and is not specified as a rule.

Hence, according to the invention individual sub-interferograms are determined on surface portions of the total measurement area covered by immersion fluid on the whole, so that the overlap regions of neighboring sub-interferograms can be evaluated without the otherwise occurring edge artefacts for producing a total interferogram. The number and position of the sub-interferograms must here be chosen such that the whole CA area is covered, as is also customary otherwise in the stitching technique. Hence, the method according to the invention allows the use of the immersion method, which is inexpensive because of the omission of a surface polish, for the first time in the stitching technique, which is also inexpensive for the measurement of large-area specimens—because of the omission of the otherwise necessary measurement beam enlargement.

According to an advantageous development of the method according to the invention the specimen is provided with two, substantially plane, main surfaces.

Plane main surfaces simplify the formation of a uniform film of the immersion fluid without complicated adaptation of the surfaces of specimen and contact bodies.

Preferably, the contact bodies are shaped in the form of contact plates.

Contact bodies in plate shape can be produced at relatively low costs and they can be handled comparatively easily. To avoid multiple interferences, it is advantageous when the contact plates have a slight wedge shape.

Contact plates of a rectangular shape have turned out to be particularly useful. At a given constructional height of the interferometer chamber, rectangular contact plates cover a larger surface area than round contact plates.

Furthermore, it has turned out to be advantageous when the contact bodies project beyond the measurement area on all sides by at least 20 mm.

It is thereby possible to measure the whole measurement area without having to put up with edge artefacts.

Furthermore, it has turned out to be useful when the contact bodies project beyond the specimen on all sides by at least 20 mm.

This facilitates the contacting of the contact bodies and the application of the immersion fluid.

It has turned out to be useful to provide a holding device for mounting specimen and contact bodies, said holding device being movable by means of a transfer system with an electrical drive in directions perpendicular to the measurement beam.

The above-mentioned "sandwich arrangement" consisting of the contact bodies and the specimen, is fixed by means of a holding device and moved for the measurements of the surface portions jointly from one position to the other. The automatic transfer system permits an exact approach to the measurement position and facilitates handling. To avoid vibrations, it is advantageous to use a vibration-free electric drive and oscillation-absorbing elements and to move the holding device at a very low speed.

It is advantageous for loading and for the preparation of the immersion film when the holding device is arranged inside an interferometer chamber and is movable by means of the transfer system outside said chamber.

As a result, the holding device can be moved outside the interferometer chamber, which facilitates the handling of large plates and samples and the loading and unloading of the holding device.

Advantageously, the positioning accuracy of the transfer system is better by at least the factor 5 than the spatial resolution of the interferometer.

As a consequence, the local position of the measurement beam can be regarded as being exactly known, which simplifies the joining of the sub-interferograms by means of the stitching technique.

The optical characteristic of the specimen material to be measured preferably encompasses the homogeneity of the refractive index and/or the stress birefringence in the measurement area.

Preferably, the transparent material of the specimen and the contact bodies is doped or undoped quartz glass.

As for the apparatus, this object starting from the above-mentioned method is achieved according to the invention in that contact bodies of transparent material rest on the main surfaces of the specimen, said contact bodies fully encompassing the measurement area, and a film being formed from an immersion fluid between the contact bodies and the main surfaces of the specimen.

The apparatus of the invention primarily serves to perform the method explained above in more detail. This method is based on a combination of the "stitching technique" with an "immersion method". To this end an apparatus is suggested which modifies the elements known from the "stitching technique", such as mounting for the specimen, interferometer, transfer system and control unit, insofar as contact bodies of transparent material are provided that fully cover the measurement area and serve to form a film of an immersion fluid over the whole measurement area.

This modification of the known apparatus permits the use of the "immersion method" and thus the use of a not precisely polished specimen so that the efforts taken in surface polishing are dispensed with. The mechanical finishing of the main surfaces of the specimen, for example by grinding, milling, lapping or cutting, is enough. The aberrations inherent to the "immersion method" in the edge area of the film of the immersion fluid upon use of the standard contact bodies with sizes within the range of the measurement beam are avoided. These aberrations prevent or render difficult the performance of the "stitching technique, i.e. the software-controlled joining of several sub-interferograms to obtain a total interferogram based on the measurement results in the overlapping regions. This is accomplished in that the film consisting of the immersion fluid is distributed by means of the contact bodies over an area comprising the whole measurement area of the specimen. Thus the whole portion of the main surfaces to be assigned to the CA area is fully wetted with a film consisting of an immersion fluid and is covered by contact bodies. The edge errors inherent to the immersion method are thereby avoided or shifted into the outside area of the specimen that does not belong to the CA area and is normally not specified.

Advantageous developments of the apparatus according to the invention become apparent from the sub-claims. Insofar as developments of the apparatus indicated in the sub-claims copy the procedures mentioned in subclaims regarding the method according to the invention, reference is made for supplementary explanation to the above comments regarding corresponding method claims.

Figure 1B:
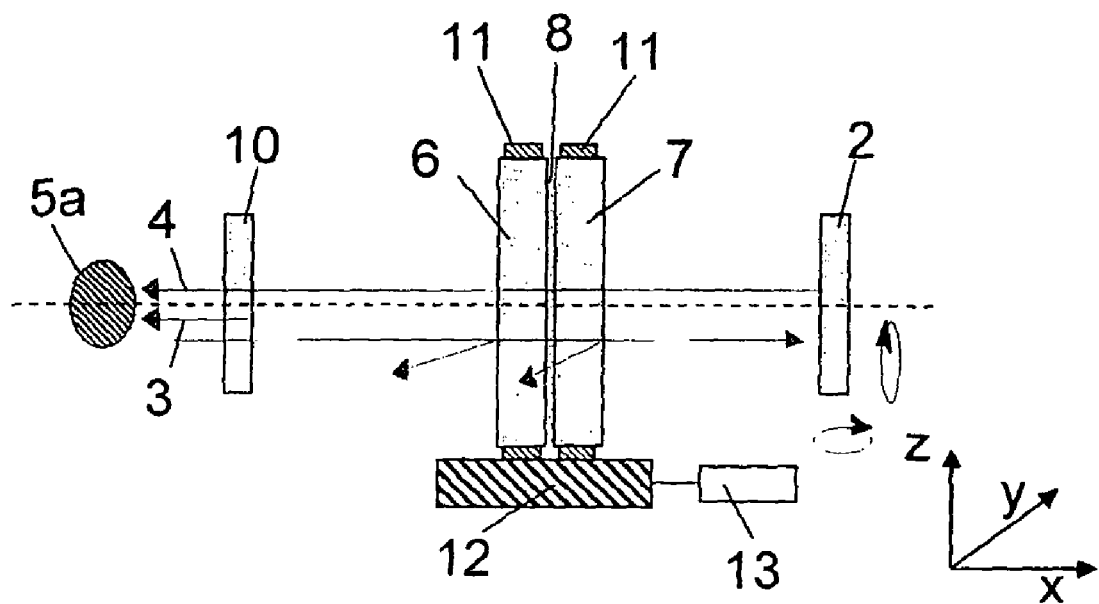
Figure 2A:
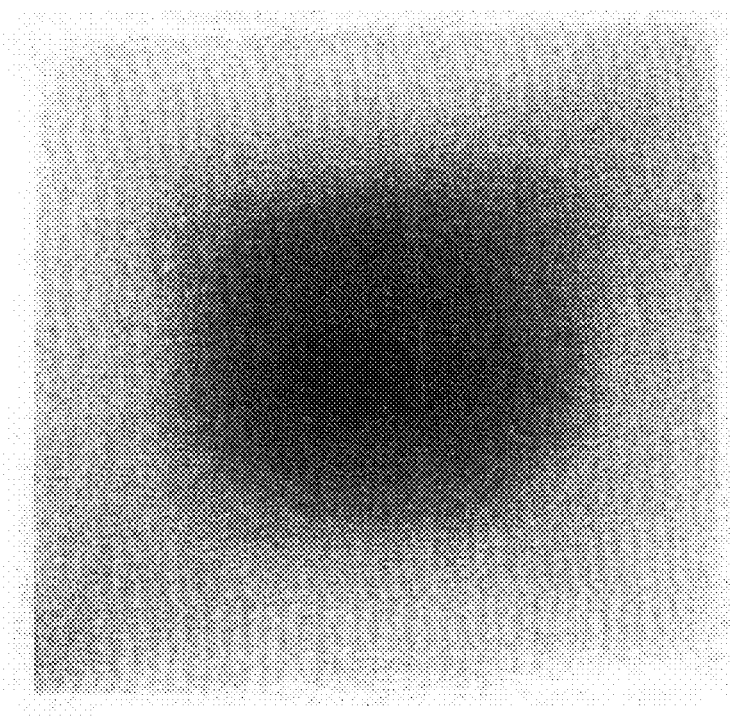
Figure 2B:
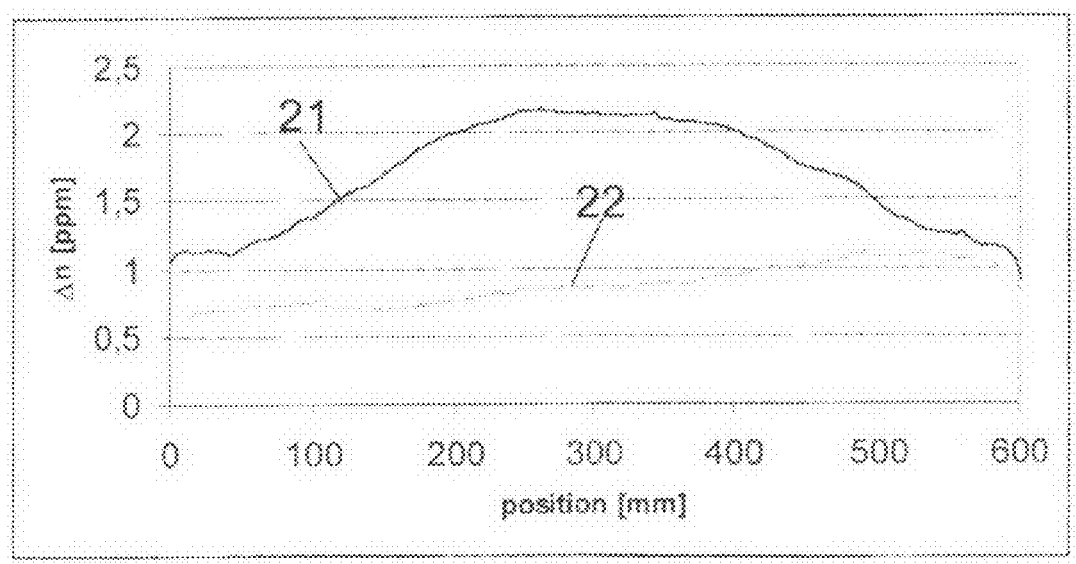
Figure 3:
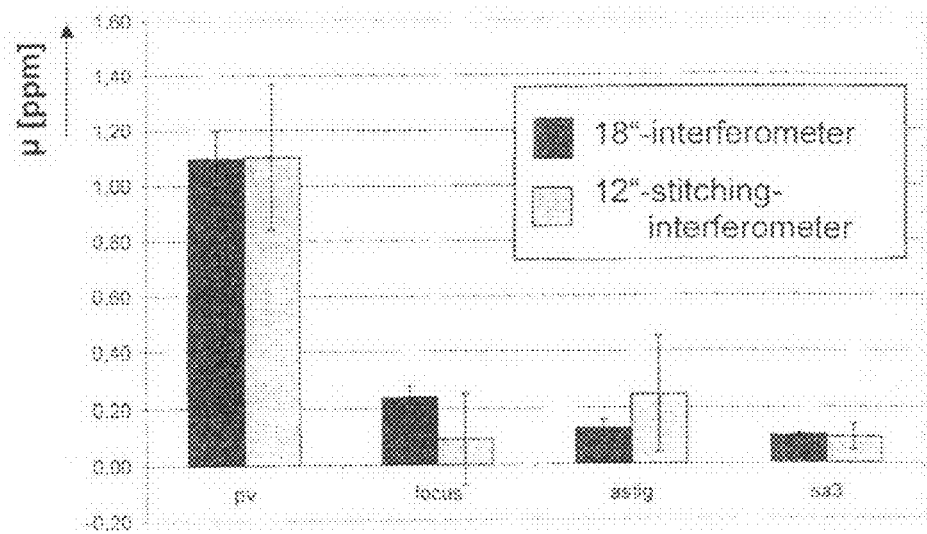
Figure 4:
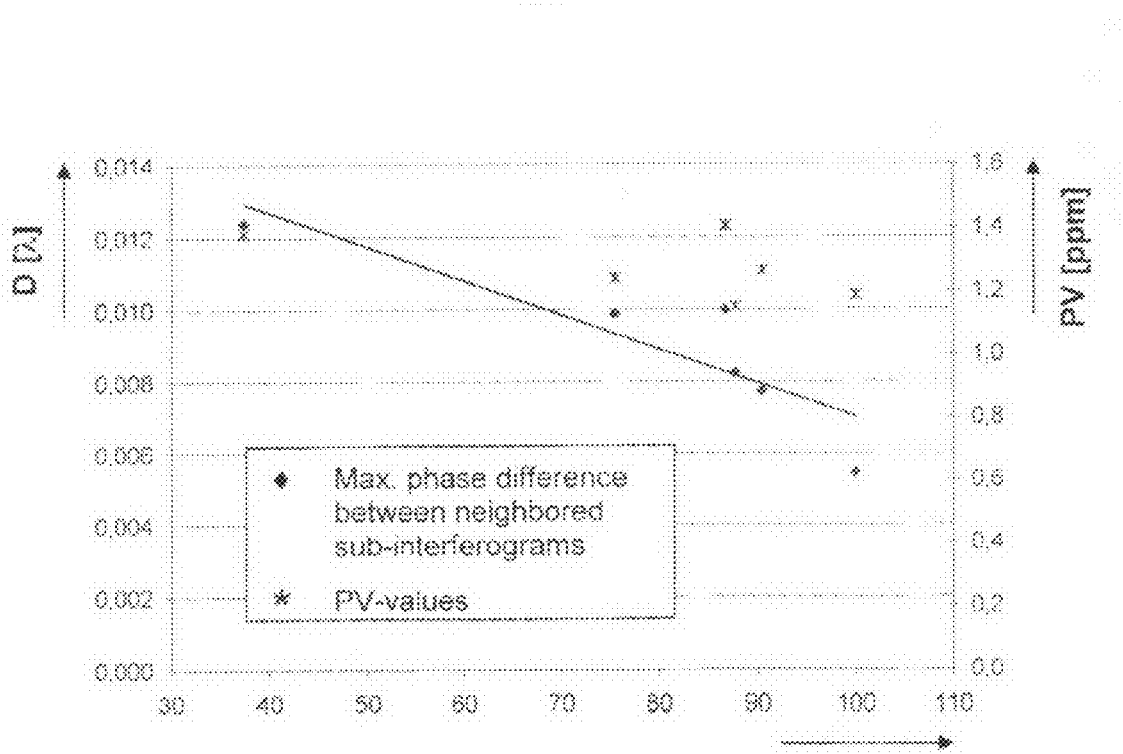

The invention shall now be explained in more detail with reference to an embodiment and a drawing, which shows in detail in FIG. 1a: an assembly for performing the measurement method according to the invention, in a schematic illustration, during measurement of a measurement sample;

FIG. 1b: the assembly according to FIG. 1a without measurement sample for recording a reference measurement;

FIG. 2a: an interferogram measured on contact plates on the basis of the stitching technique;

FIG. 2b: the refractive index profile over the interferogram according to FIG. 2a;

FIG. 3: a bar diagram for comparing the measurement results of various optical characteristics obtained with the help of the stitching technique and a simple interferometer measurement; and FIG. 4: is a diagram for illustrating the influence of the extent of the overlap of sub-interferograms in the stitching technique on different measurement values.

FIGS. 1a and 1b schematically show an assembly for measuring the refractive index homogeneity in the area of a measurement area "CA" of a measurement sample 1 to be specified, using the method according to the invention. Use is made of a Fizeau interferometer (Zygo GPI series) with an aperture of 12 inches and an HeNe layer having an operating wavelength of 632.8 nm. The interferometer is equipped with a camera having a resolution of 640×480 pixies and is mounted on an optical bench which is mainly decoupled from ambient vibrations by means of an active and a passive vibration isolation system. The whole measurement assembly is thermalized by means of an air conditioning system with two control loops to +/−0.1° K.

The interferometer optics forms a parallel beam with substantially plane wavefronts from the HeNe laser beam. By reflection on the first interferometer mirror 10, a reference beam 3 is branched off from the beam and reflected back. The measurement beam 4 proper passes through the measurement sample 1 (FIG. 1a) in a portion of the measurement area "CA" and is then reflected back by the second interferometer mirror 2. Measurement beam 4 and reference beam 3 are superposed in the interferometer, thereby yielding a first interferometric measurement, the measurement data of which are stored and imaged by means of the camera as a first interferogram 5a.

The measurement sample 1 is a rectangular semifinished product of synthetic quartz glass for a large lens for focusing laser radiation. The measurement sample 1 comprises two plane-ground flat sides and is clamped between two contact plates 6, 7 adjoining the flat sides thereof and having a rectangular cross-section.

The plane surfaces of the contact plates 6, 7 are precisely polished ($\leq \lambda/10$). A film 8 of an immersion fluid is provided between the contact surfaces at both sides, the film extending over the whole area of the flat sides of the measurement sample. To this end the contact plates 6, 7 are configured to be so large that they project over the round measurement sample 1 on all sides by at least 20 mm.

The contact plates 6, 7 have a rectangular cross-section. Their dimensions amount to about 650 mm×650 mm×100 mm. They consist of homogeneous quartz glass of natural raw materials that can be obtained commercially under the name Herasil 102 from the company Heraeus Quartzglas GmbH & Co. KG, Hanau.

The immersion fluid 8 is a commercially standard oil which at 22.0° C. and at the operating wavelength of $\lambda$=632.8 nm has a refractive index of 1.45704.

To eliminate the influence of contact plates and immersion fluid on the measurement result, a further measurement is carried out without measurement sample 1, as is schematically shown in FIG. 1b. A second interferogram 5b is here obtained. The resulting measurement values are subtracted from the measurement values of the first interferogram 5a such that the change in the wavefront of the measurement beam 4, which change is effected by the measurement sample 1, is obtained as the final result.

The contact plates 6, 7 and the measurement sample 1 are held on a holding device and fixed relative to one another. For accommodating a respective contact plate 6, 7 the holding device comprises two clamping frames 11 which act on the periphery of a contact plate 6, 7 and which are fixed on a movable support 12. For loading and for the preparation with the immersion oil the support 12 may be moved outside the interferometer chamber, which facilitates handling considerably.

The support 12 is moved by means of a transfer system which in FIG. 1a is schematically illustrated by a linear motor 13. The transfer system 14 is mounted on the optical bench and has not contact with the ground. This exploits the vibration damping action also for the transfer system 13 and the holding device. To avoid vibration generation by the transfer system 13, low-vibration electric drives, precision bearings and vibration damping elements are used for generating the movement. Moreover, the movement speed of the transfer system is low to minimize vibrations.

With the help of the transfer system 13 the holding device is movable in a plane perpendicular to the propagation direction of the measurement beam 4.

Furthermore, a control unit (not shown in the figure) is provided for setting and acquiring and evaluating data and for controlling the transfer system 13.

The apparatus according to the invention can basically be used for samples with measurement areas of any desired size. In the embodiment the measurement area is limited to 610 mm×610 mm because of the dimensions of the existing interferometer chamber.

An embodiment shall now be explained in more detail in the following for the method according to the invention with the help of FIG. 1:

It is the task to determine the refractive index distribution within the CA area having the above-mentioned dimensions of 420 mm×405 mm. To this end the measurement sample 1 which is plane-ground, provided with immersion oil and fixed together with the polished contact plates 6, 7 in the frame 11 is successively moved by means of the transfer system 13 to pre-calculated positions relative to the light path of the interferometer so as to take section measurements of the whole CA area, as is standard in the stitching technique. The positions are chosen such that the sub-interferograms cover the whole CA area, with overlaps between neighboring measurement areas being obtained.

For joining the individual sub-interferograms a specifically developed software is used that is based on the method of the least square deviation.

Number and scope of remaining stitching errors depend substantially on the measuring accuracy of the interferometer, but also on the selected overlap and the evaluation of the measurement values from the overlap regions.

FIG. 2*a* shows an interferogram of square contact plates 6, 7 that was measured with the help of the stitching technique as schematically shown in FIG. 1*b*. The measurement area is 610 mm×610 mm. The total interferogram is composed of fifteen sub-interferograms with a respective measurement area of 12 inches each. The existing stitching errors are small.

FIG. 2*b* shows the result of the interferogram according to FIG. 2*a* with respect to the refractive index profile over the cross-section of the contact plates 6, 7 on the basis of a diagram. On the y-axis, the refractive index difference $\Delta n$ is plotted in ppm, and on the x-axis the position in mm. Line 21 shows the refractive index profile in the area of one of the central lines 23 (FIG. 2*a*) and line 22 the refractive index profile in the edge area 24 (FIG. 2*a*) of the contact plate. 2.2 ppm is here measured as the maximum refractive index inhomogeneity. Small jumps in the two curves are due to stitching errors; these are however smaller than 0.02 ppm at any rate.

The bar diagram of FIG. 3 also gives an impression on the accuracy and reproducibility of the stitching technique. The figure shows results of interferometric measurements taken on a measurement sample of quartz glass with a measurement area having a diameter of 300 mm with respect to the PV value (pv), focus (focus) astigmatism (astig) and spherical aberration (a3). On the y-axis, the mean value "μ" is plotted for the respective characteristic.

The left bar represents the respective results determined with an 18" interferometer according to the standard method, and the right bar shows the results determined with a 12" interferometer by means of the method of the invention and the stitching technique. An aberration bar is plotted each time, the bar being indicative of the 95% confidence region and based in the standard measurements on 20 records and in the method according to the invention on 7 records. The diagram shows that results determined by means of standard method and method according to the invention are identical within the scope of the confidence region.

In the stitching technique the measuring accuracy is known to depend on the selected overlap of the interferogram. Therefore, this dependence also exists in the method of the invention, as can be seen from the diagram of FIG. 4. On the x-axis, the overlap "Ue" is plotted as a %-portion of the redundant points of the total interferogram. On the left side of the y-axis, a measure "D" is plotted for the maximal phase difference on the edge of the overlapping sub-interferogram in units of the operating wavelength [$\lambda$] and on the right side of the y-axis the maximum differences (PV values) of the interferogram over a CA area of 500 mm. As expected, the stitching errors are decreasing with an increasing overlap. For practical applications an overlap of about 90% (with respect to the number of redundant pixels) is sufficient. By comparison the PV values of the joined wavefront interferograms show no dependence on the overlap.

The invention claimed is:

1. A method for interferometric measurement of an optical characteristic of a measurement area of a specimen of transparent material having two opposing main surfaces, said method comprising:
    (a) arranging the specimen in a measurement light beam of an interferometer such that the measurement light beam of the interferometer passes through the main surfaces of the specimen in a first surface portion of the measurement area, and performing a first interferometric measurement to obtain a first group of measurement data;
    (b) arranging the specimen in the measurement light beam such that the measurement beam passes through the main surfaces of the specimen in a second surface portion of the measurement area which is offset from the first surface portion and overlaps therewith in an overlap region, and performing a second interferometric measurement to obtain a second group of measurement data;
    (c) matching the measurement data of the first group of measurement data and the second group of measurement data using redundant information obtained in the overlap region for preparing a total interferogram on the measurement area,
    wherein the measurement area is fully covered with immersion fluid film, which is formed between the main surfaces of the specimen and contact bodies of transparent material.

2. The method according to claim 1, wherein the specimen is provided with two, substantially planar main surfaces.

3. The method according to claim 1, wherein the contact bodies are shaped in the form of contact plates.

4. The method according to claim 3, wherein the contact plates have a rectangular shape.

5. The method according to claim 1, wherein the contact bodies extend past the measurement area on all sides by at least 20 mm.

6. The method according to claim 1, wherein the contact bodies extend beyond the specimen on all sides by at least 20 mm.

7. The method according to claim 1, wherein a holding device which is movable by a transfer system with an electric drive in directions perpendicular to the measurement beam is provided holding the specimen and the contact bodies.

8. The method according to claim 7, wherein the holding device is supported inside an interferometer chamber so as to be movable by the transfer system outside said chamber.

9. The method according to claim 7, wherein a positioning accuracy of the transfer system is hither than a spatial resolution of the interferometer by at least a factor of 5.

10. The method according to claim 1, wherein the optical characteristic of the specimen material encompasses a homogeneity of the refractive index or a stress birefringence in the measurement area.

11. The method according to claim 1, wherein the transparent material of the specimen and the contact bodies is doped or undoped quartz glass.

12. An apparatus for measuring an optical characteristic in an operating area of a specimen of transparent material having two opposing main surfaces, said apparatus comprising:
  (a) a holding device for the specimen;
  (b) an interferometer configured to direct a measurement beam onto surface portions of a measurement area of the specimen and to measure sub-interferograms of the surface portions;
  (c) a transfer system by which the specimen is movable in a direction perpendicular to the measurement beam so that measurements can be obtained on a plurality of surface portions which fully encompass the measurement area, each of the surface portions being overlapped by a neighboring surface portion at least in part in an overlap region; and
  (d) a control unit which controls the interferometer and the transfer system and, based on the sub-interferograms, determines a shape of a wavefront transmitted by the specimen, the measurement data obtained from the overlap regions being used for matching the sub-interferograms with one another, wherein contact bodies of transparent material rest on the main surfaces of the specimen, said contact bodies fully encompassing the measurement area, and wherein a film formed from an immersion fluid is between the contact bodies and the main surfaces of the specimen.

13. The apparatus according to claim 12, wherein the specimen is provided with two substantially planar main surfaces.

14. The apparatus according to claim 12, wherein the contact bodies are shaped in the form of contact plates.

15. The apparatus according to claim 14, wherein the contact bodies have a rectangular shape.

16. The apparatus according to claim 12, wherein the contact bodies project beyond the measurement area on all sides by at least 20 mm.

17. The apparatus according to claim 12, wherein the contact bodies project beyond the specimen on all sides by at least 20 mm.

18. The apparatus according to claim 12, wherein the holding device is provided jointly holding the specimen and the contact bodies.

19. The apparatus according to claim 18, wherein the holding device is supported inside an interferometer chamber and is movable by the transfer system outside said chamber.

20. The apparatus according to claim 12, wherein a positioning accuracy of the transfer system is better than a spatial resolution of the interferometer by at least a factor of 5.

* * * * *